United States Patent Office 2,805,236

Patented Sept. 3, 1957

2,805,236

2,4 - DI (FORMYL) CYCLOPENTYLTRIORGANOSILANES AND PROCESS FOR THEIR PREPARATION

Alfred D. Kiffer, Kenmore, and William T. Black, Buffalo, N. Y., assignors to Union Carbide Corporation, a corporation of New York No Drawing. Application March 28, 1955, Serial No. 497,414

11 Claims. (Cl. 260—448.2)

This invention relates to new organic compounds of silicon which comprise the 2,4-di(formyl)cyclopentyltriorganosilanes and to a process for their preparation. More particularly, the invention relates to a new class of organic compounds of silicon which comprise the alkyl, alkylalkoxy and alkoxy substituted 2,4-di(formyl)-cyclopentylsilanes and to a process for their preparation which includes hydrogenating the ozonides of the alkyl, the alkylalkoxy and the alkoxy substituted bicycloheptenylsilanes.

The new compositions of the instant invention, namely the 2,4-di(formyl)cyclopentyltriorganosilanes can be represented graphically by the formula:

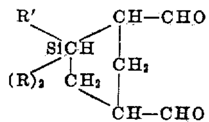

where R and R′ represent organic groups such as alkyl groups or alkoxy groups. Examples of the alkyl groups which R and R′ may represent include methyl, ethyl, propyl and the like groups, while examples of the alkoxy groups which R and R′ may represent include methoxy, ethoxy, propoxy and the like groups. The organic groups represented by R and R′ need not necessarily be like groups, that is R and R′ may represent different alkyl groups, different alkoxy groups or one may represent an alkyl group while the other may represent an alkoxy group.

In accordance with our invention the new aldehydes thereof are prepared by first reacting a bicycloheptenyltriorganosilane with ozone to form an ozonide. The resulting ozonide is then hydrogenated with the formation of the aldehyde. The overall reaction may be depicted by the following equation:

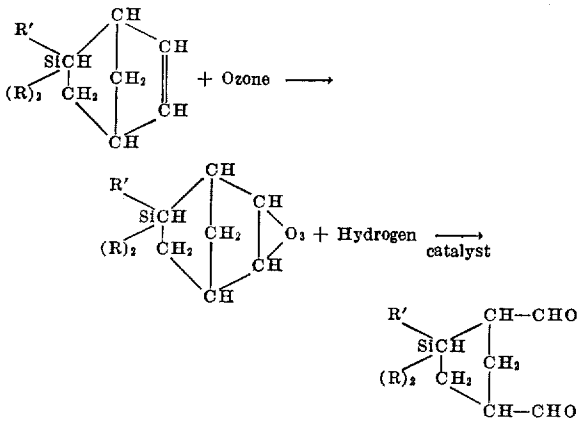

where R and R′ represent organic groups as shown above.

The process can be carried out by introducing ozone into a solution of a bicycloheptenyltriorganosilane at low temperatures to form the corresponding ozonide and then introducing hydrogen into a solution of the ozonide at low temperatures and in the presence of a catalyst to form the 2,4-di(formyl)cyclopentyltriorganosilanes of the invention.

By the term low temperatures, as used herein, we mean temperatures of about 50° C. and below. Temperatures above 50° C. favor undesirable side reactions according to our experience, and are not preferred. By way of illustration, in the ozonolysis step of the process we have noted a tendency of ozone to decompose and also a tendency of the starting materials to undergo an undesirable oxidation at temperatures above about 50° C. In addition, the hereinabove defined low temperatures are desirable in the hydrogenation of the ozonide as at such temperatures the tendency of the ozonide to decompose, rather than react with hydrogen, is kept to a minimum. The temperatures employed are in some instances governed by the physical properties of the system, as for example the freezing point of the particular solvent present. We have found it preferable to employ temperatures of from about −80° C. to about 30° C., especially temperatures of from about −80° C. to about −30° C., when conducting the ozonolysis step of our process and temperatures of from about −30° C. to about 50° C., especially temperatures of from about −10° C. to about 10° C., when conducting the hydrogenation step.

As solvents we can employ practically any of the so called liquid organic solvents in which our bicycloheptenyltriorganosilane starting material as well as the corresponding ozonide are soluble and which is non-reactive, under the conditions of our process, with the bicycloheptenyltriorganosilane starting material, ozone, the resulting ozonide and hydrogen. Desirable for use are the alkanols such as for example methanol, ethanol, propanol and the like.

We prefer to carry out the process of our invention under substantially anhydrous conditions. However, the presence of water is not objectionable, except when the starting material contains alkoxy groups bonded to the silicon atom thereof. The presence of water is objectionable in the latter instance due to the tendency of the alkoxy groups to hydrolyze when in admixture therewith.

In the hydrogenation step of our process any of the well known class of hydrogenation catalysts may be employed. We prefer to use such active hydrogenation catalysts as platinum, palladium black, palladium oxide and Raney nickel. The amount of catalyst employed is not narrowly critical and from about 0.3 percent to about 3.0 percent by weight of the starting bicycloheptenylsilane is preferred but higher or lower amounts can be used with good results.

It is an essential feature of the invention that in our bicycloheptenyltriorganosilane starting materials the olefinic linkage in the bicycloheptenyl radical be removed by at least 3 carbon atoms from the silicon atom of the compound. Representative of our starting materials are the bicyclo (2.2.1) hept-5-enyl-2 triorganosilanes which can be represented graphically by the formula:

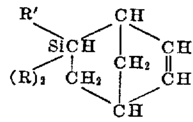

where R and R′ represent organic groups such as alkyl groups and alkoxy groups. Examples of the alkyl groups which R and R′ may represent include methyl, ethyl, propyl and the like groups while examples of the alkoxy groups which R and R′ may represent include methoxy, ethoxy, propoxy and the like groups. As is evident R and R′ may represent different alkyl groups, different alkoxy groups, or one may represent an alkyl group while the other an alkoxy group.

Without wishing to be bound by any particular theory, one possible explanation for the position of the olefinic linkage in the bicycloheptenyl radical is that when the olefinic linkage is less than three carbon atoms removed from the silicon atom, the carbon to silicon bond of the products formed as a result of subsequent reactions, such as hydrogenation, oxidation or hydrolysis, is extremely weak and cleavage thereof apparently takes place. By way of illustration, ozonolysis of vinyltrimethylsilane and allyltrimethylsilane, under conditions the same or similar to those used in the present invention, did apparently result in the formation of the corresponding ozonides; but upon subsequent hydrogenation of the ozonides, it was not possible to obtain the aldehydes.

Similarly, according to our experience, ozonolysis of 2-butenyltrimethylsilane and subsequent hydrogenation of the ozonide in solution will produce an aldehyde; (analysis of reaction solution indicated presence of aldehyde groups) however, the aldehyde could not be recovered from solution. Instead there was recovered a mixture which was predominantly trimethylmethoxysilane with minor amounts of higher boiling silicon compounds. One of these compounds was identified as the dimethyl acetal of (trimethylsilyl) acetaldehyde.

The bicyclo (2.2.1) hept-5-enyl-2 triorganosilanes which we employ as starting materials can be prepared by the reaction of cyclopentadiene with a vinyl organosilane. For example, bicyclo (2.2.1) hept-5-enyl-2 triethoxysilane may be prepared by reacting cyclopentadiene with vinyltriethoxysilane; bicyclo (2.2.1) hept-5-enyl-2 triethylsilane may be prepared by the reaction of cyclopentadiene with vinyltriethylsilane; bicyclo (2.2.1) hept-5-enyl-2 ethyldiethoxysilane may be prepared by reacting cyclopentadiene with vinylethyldiethoxysilane; and bicyclo (2.2.1) hept-5-enyl-2 diethylethoxysilane may be prepared by reacting cyclopentadiene with vinyldiethylethoxysilane.

The 2,4-di(formyl)cyclopentyltriorganosilanes of this invention are prepared by dissolving a bicyclo (2.2.1) hept-5-enyl-2 triorganosilane such as bicyclo (2.2.1) hept-5-enyl-2 triethylsilane in a suitable solvent, such as methanol, and placing a flask thereof within a bath cooled with solid carbon dioxide. When the solution has reached the temperature of the bath, which will be about −80° C., ozone, which may be produced in the silent electric discharge, is bubbled through the solution until no more is absorbed which indicates that ozonolysis is complete. The appearance of ozone in the off gas can be detected by a bubbler filled with a solution of potassium iodide and also by the fact that the reaction solution turns blue as a result of the presence of excess ozone. Excess absorbed oxygen and ozone can be removed from the reaction solution by sparging with nitrogen gas. Hydrogenation of the ozonide is effected by placing the solution containing the ozonide in a hydrogenation flask, adding a catalyst and charging hydrogen thereinto. The hydrogenation is preferably conducted at low temperatures and it will be found desirable to place the flask in a water ice bath during the reaction. Upon completion of the hydrogenation reaction, that is when all of the ozonide has been reacted, the solution is then filtered to remove the catalyst and other solids if present.

We have found that the aldehydes of our invention do not form completely stable solutions with alkanols. That is, if the aldehydes are dissolved in an alkanol and the solution permitted to stand for several hours the aldehyde groups are converted to unreactive alkyl acetals. Consequently, since the preferred solvents employed in the ozonolysis and hydrogenation steps are alkanols, it will be desirable to replace the alkanol with a solvent non-reactive with the aldehydes as for instance, an aromatic hydrocarbon after hydrogenation is completed. According to our experience the di(formyl)cyclopentyltriorganosilanes of the present invention when in solution with aromatic hydrocarbons, as for example toluene or other solvents non-reactive therewith, can be stored for over a period of several months without deterioration or decomposition.

The following examples are illustrative of the invention.

*Example 1*

A solution comprising 26 grams of bicyclo (2.2.1) hept-5-enyl-2 triethoxysilane and 150 cc. of absolute ethanol was placed in a flask and the flask positioned in a bath cooled by adding solid carbon dioxide. The solution was permitted to cool to the temperature of the bath (approximately −40° C.). Ozone, prepared in the silent electric discharge at a concentration of about 4 mole percent in oxygen, was then bubbled into the solution. The completion of the ozonolysis was noted by both the appearance of ozone in the off gas as detected by a bubbler filled with a solution of potassium iodide and by noting that the color of the reaction solution became blue. Excess absorbed oxygen and ozone were removed from the reaction solution by sparging with nitrogen gas. The solution was then transferred to a hydrogenation flask containing 0.5 gram of palladium black and the flask positioned within a water-ice bath. Hydrogen was introduced into the solution until the pressure in the flask reached about 3 atmospheres and the flask then slowly shaken. When the pressure in the flask ceased to drop, the solution was removed therefrom and passed through a filter to separate the catalyst. The solution was then placed in a still and the water and ethanol removed therefrom by a vacuum stripping operation under a vacuum of 1 mm. Hg. pressure absolute. During the stripping operation the temperature did not rise above 50° C. The aldehyde was obtained as a residue in the form of a thick syrupy liquid residue. This residue was identified as 2,4-di(formyl)cyclopentyltriethoxysilane upon analysis with the following data obtained:

| | Analysis (Wt. Percent) | Theory (Wt. Percent) for 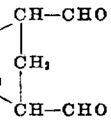 |
|---|---|---|
| C | 53.4 | 54.0 |
| H | 8.2 | 8.3 |
| Si | 8.0 | 9.7 |

The yield of 2,4-di(formyl)cyclopentyltriethoxysilane was 69% of theory based on the bicyclo (2.2.1) hept-5-enyl-2 triethoxysilane starting material.

*Example 2*

A solution comprising 24 grams of bicyclo (2.2.1) hept-5-enyl-2 ethyldiethoxysilane and 175 cc. of dry methanol was placed in a flask and the flask positioned in a bath cooled with solid carbon dioxide. The solution was permitted to cool to the temperature of the bath (approximately −78° C.). Ozone, produced in the silent electric discharge at a concentration of about 4 mole percent in oxygen, was then bubbled into the solution. The completion of the ozonolysis was noted by both the appearance of ozone in the off gas as detected by a bubbler filled with a solution of potassium iodide and by noting that the color of the reaction solution became blue. Excess absorbed oxygen and ozone were removed from the reaction solution by sparging with nitrogen gas. The solution was then transferred to a hydrogenation flask containing .25 gram of palladium black and the flask positioned within a water-ice bath. Hydrogen was introduced into the solution until the pressure in the flask reached about 3 atmospheres and the flask then slowly shaken. When the pressure in the flask ceased to drop the solution was removed therefrom, filtered to remove the catalyst and benzene added to the filtrate. The benzene, methanol and water were then stripped from solution by distillation and the resulting material tested for aldehyde content with Schiff's reagent. 2,4 - di(formyl)cyclopentylethyldiethoxysilane was identified through a positive test for aldehyde content.

The new compounds of our invention are useful as starting materials in the preparation of both monomeric and polymeric organosilanes. For example, as disclosed and claimed in copending application Serial No. 497,448, filed concurrently herewith, the compounds of our invention are employed as starting materials in the preparation of their corresponding alcohols. In addition, the new compounds, by virtue of their aldehyde groups find use as linking agents for organic containing resins, particularly the phenol- and urea-formaldehyde condensation resins, which are employed as coatings, and as casting compositions. The new compounds may also be employed as linking agents for hydroxyl free polysiloxanes which linked polymers find use as high temperature resistant enamels. Our new compounds may also be employed in the preparation of polysiloxanes containing silicon-bonded aldehyde groups which polysiloxanes are suitable for use as coatings. Such polymeric materials are disclosed as new compositions of matter in United States application Serial No. 508,313, filed May 13, 1955.

What is claimed is:

1. 2,4 - di(formyl)cyclopentyltriorganosilanes represented by the graphic formula:

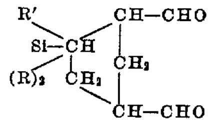

wherein R and R' represent organic groups taken from the class consisting of alkyl groups and alkoxy groups.

2. 2,4 - di(formyl)cyclopentyltrialkylsilanes.

3. 2,4 - di(formyl)cyclopentyltrialkoxysilanes.

4. 2,4 - di(formyl)cyclopentyltrimethylsilane.

5. 2,4 - di(formyl)cyclopentyltriethoxysilane.

6. 2,4 - di(formyl)cyclopentylethyldiethoxysilane.

7. A process for preparing a 2,4-di(formyl)cyclopentyltriorganosilane, represented by the formula:

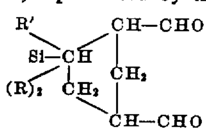

where in R and R' represent organic groups taken from the class consisting of alkyl groups and alkoxy groups, which comprises introducing ozone into a solution of a bicyclo(2.2.1)hept - 5 - enyl - 2 - triorganosilane represented by the formula:

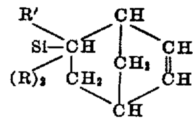

wherein R and R' represent organic groups taken from the class consisting of alkyl groups and alkoxy groups, to form the ozonide of said bicyclo(2.2.1)hept-5-enyl-2-triorganosilane and introducing hydrogen into a solution of said ozonized bicyclo(2.2.1)hept-5-enyl-2-triorganosilane in the presence of a hydrogenating catalyst to form said 2,4-di(formyl)cyclopentyltriorganosilane.

8. A process for preparing a 2,4 - di(formyl)cyclopentyltrialkoxysilane which comprises introducing ozone into an alkanol solution of a bicyclo (2.2.1) hept-5-enyl-2 trialkoxysilane at a temperature below about 30° C., to form the ozonide of said trialkoxysilane and introducing hydrogen into a solution of said ozonized bicyclo (2.2.1) hept-5-enyl-2 trialkoxysilane at a temperature below about 50° C. and in the presence of a hydrogenating catalyst to form a 2,4-di(formyl)cyclopentyltrialkoxysilane.

9. A process for preparing a 2,4 - di(formyl)cyclopentyltrialkylsilane which comprises introducing ozone into an alkanol solution of a bicyclo (2.2.1) hept-5-enyl-2 trialkylsilane at a temperature below about 30° C., to form the ozonide of said bicyclo (2.2.1) hept-5-enyl-2 trialkylsilane and introducing hydrogen into a solution of said ozonized bicyclo (2.2.1) hept-5-enyl-2 trialkylsilane at a temperature below about 50° C. and in the presence of a hydrogenating catalyst to form a 2,4 - di(formyl)cyclopentyltrialkylsilane, said hydrogenation being conducted in the presence of a hydrogenating catalyst and at a temperature below about 50° C.

10. A process for preparing 2,4 - di(formyl)cyclopentyltriethoxysilane which comprises introducing ozone into an ethanol solution of a bicyclo (2.2.1) hept-5-enyl-2 triethoxysilane at a temperature of from about −80° C. to about +30° C. to form the ozonide of said bicyclo (2.2.1) hept - 5 - enyl - 2 triethoxysilane and introducing hydrogen into a solution of ozonized bicyclo (2.2.1) hept - 5 - enyl - 2 triethoxysilane at a temperature below about 10° C. and in the presence of a palladium catalyst to form 2,4 - di(formyl)cyclopentyltriethoxysilane.

11. A process for preparing 2,4 - di(formyl)cyclopentylethyldiethoxysilane which comprises introducing ozone into a methanol solution of a bicyclo (2.2.1) hept - 5 - enyl - 2 ethyldiethoxysilane at a temperature of from about −80° C. to about +30° C. to form the ozonide of said bicyclo (2.2.1) hept-5-enyl-2 ethyldiethoxysilane and introducing hydrogen into a solution of ozonized bicyclo (2.2.1) hept - 5 - enyl - 2 ethyldiethoxy at a temperature below about 10° C. and in the presence of a palladium catalyst to form 2,4 - di(formyl)cyclopentylethyldiethoxysilane.

No references cited.

UNITED STATES PATENT OFFICE
Certificate of Correction

Patent No. 2,805,236 September 3, 1957

Alfred D. Kiffer et al.

It is hereby certified that error appears in the printed specification of the above numbered patent requiring correction and that the said Letters Patent should read as corrected below.

Column 1, lines 28 to 33, the formula should appear as shown below instead of as in the patent—

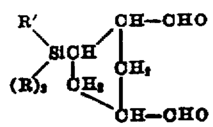

lines 50 to 68, the equation should appear as shown below instead of as in the patent—

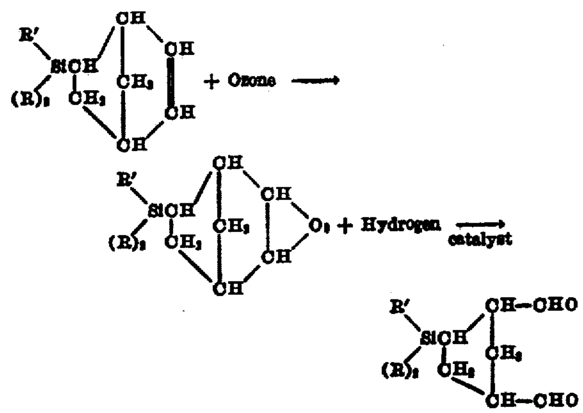

column 2, lines 62 to 68, the formula should appear as shown below instead of as in the patent—

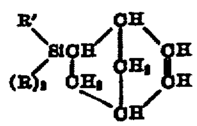

column 3, line 56, for "ozygen" read —oxygen—; column 5, lines 35 to 39, the formula should appear as shown below instead of as in the patent—

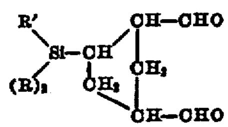

lines 50 to 55, the formula should appear as shown below instead of as in the patent—

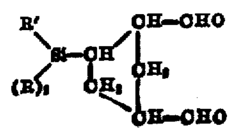

column 6, lines 3 to 7, the formula should appear as shown below instead of as in the patent—

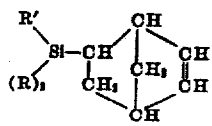

Signed and sealed this 4th day of February 1958.

[SEAL]

Attest:
KARL H. AXLINE,
*Attesting Officer.*

ROBERT C. WATSON,
*Commissioner of Patents.*